(12) United States Patent
Demedash

(10) Patent No.: US 8,414,060 B2
(45) Date of Patent: Apr. 9, 2013

(54) FASTENING OF A FABRIC COVER TO SURFACES OF A VEHICLE

(76) Inventor: Lloyd Demedash, Winnipeg (CA)

(*) Notice: Subject to any disclaimer, the term of this patent is extended or adjusted under 35 U.S.C. 154(b) by 116 days.

(21) Appl. No.: 13/041,517

(22) Filed: Mar. 7, 2011

(65) Prior Publication Data

US 2011/0215611 A1    Sep. 8, 2011

Related U.S. Application Data

(60) Provisional application No. 61/311,266, filed on Mar. 5, 2010.

(51) Int. Cl.
*B60P 7/04* (2006.01)
(52) U.S. Cl. .................. 296/100.16; 160/368.1
(58) Field of Classification Search .......... 296/98, 296/100.01, 100.16, 136.01, 136.03, 136.1; 160/370.21, 368.1
See application file for complete search history.

(56) References Cited

U.S. PATENT DOCUMENTS

| | | | | |
|---|---|---|---|---|
| 2,944,601 A | * | 7/1960 | Compson | 160/370.21 |
| 3,338,293 A | * | 8/1967 | Hohmann | 160/370.21 |
| 3,659,319 A | * | 5/1972 | Erickson | 24/304 |
| 4,523,657 A | * | 6/1985 | Kooyumjian | 180/68.1 |
| 4,607,876 A | * | 8/1986 | Reed | 296/100.18 |
| 5,441,095 A | * | 8/1995 | Trethewey | 160/370.21 |
| 5,588,476 A | * | 12/1996 | Trethewey | 160/370.21 |
| 5,797,643 A | * | 8/1998 | Demedash | 296/100.16 |
| 6,386,616 B1 | * | 5/2002 | Wheatley | 296/100.16 |
| 2011/0215611 A1 | * | 9/2011 | Demedash | 296/100.16 |

* cited by examiner

*Primary Examiner* — Glenn Dayoan
*Assistant Examiner* — Gregory Blankenship
(74) *Attorney, Agent, or Firm* — Kyle R. Satterthwaite; Ryan W. Dupuis; Ade & Company Inc.

(57) ABSTRACT

A fastening element features a female cap member and a unitary stud body defining a flexible base portion and a projecting portion integral therewith. A peripheral rim of the projecting portion stands upwardly from the base portion and is engageable into the female cap member as a snap fastener, and a bottom surface of the flexible base is deformable relative to the projecting portion. A layer of adhesive is sandwiched between the bottom surface of the flexible base portion and a removable covering layer for adhering to a surface on which stud is to be mounted. The one piece stud body can be produced efficiently while its flexible base is adaptable to mount on any of a variety of differently shaped surfaces, such as non-planar surfaces of a vehicle body to allow selective securing of a fabric cover on the vehicle via a corresponding female cap secured on the cover.

18 Claims, 3 Drawing Sheets

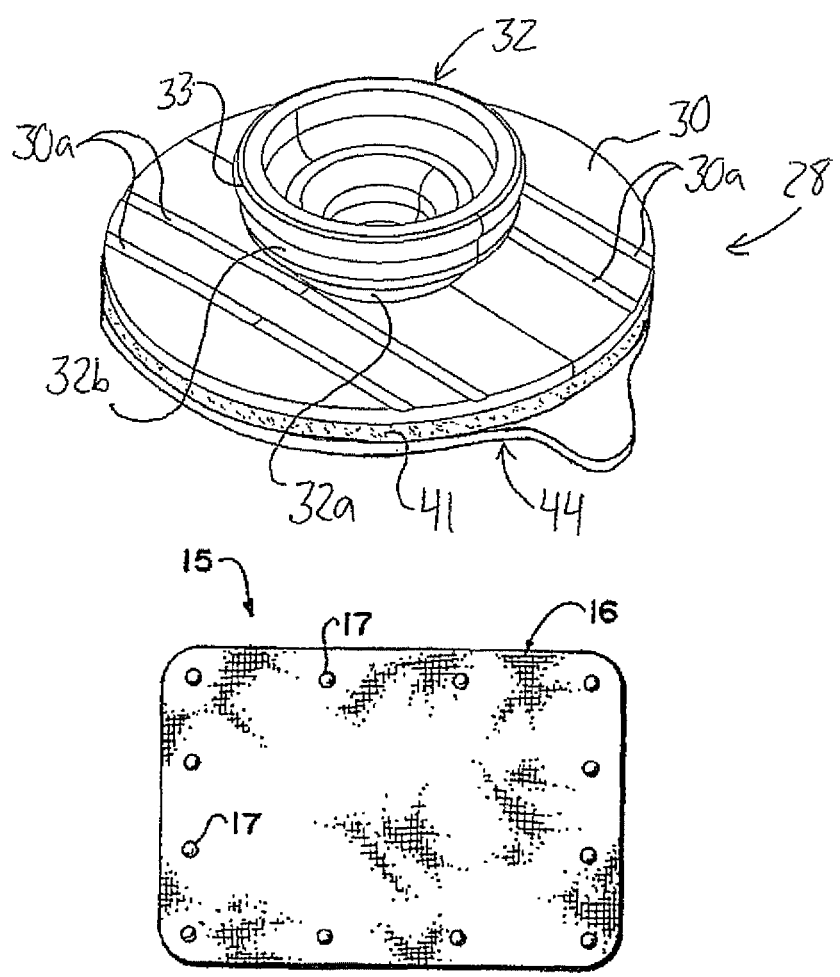

FASTENING OF A FABRIC COVER TO SURFACES OF A VEHICLE

CROSS REFERENCE TO RELATED APPLICATIONS

This application claims benefit under 35 U.S.C. 119(e) of U.S. Provisional Patent Application Ser. No. 61/311,266, filed Mar. 5, 2010.

FIELD OF THE INVENTION

The present invention relates to fasteners used for fastening a fabric cover to surfaces of a vehicle.

BACKGROUND OF THE INVENTION

It is well known to provide fabric covers which engage over the grill of a vehicle. Such covers can be imperforate for acting as a winter front to reduce the amount of cooling air passing through the grill or can constitute a bug screen in which case the fabric cover is formed from a perforated screen material to allow air to flow through while preventing passing of insects and other debris.

It is also well known to provide a cover for the box of a pick-up truck which is known as a tonneau cover.

In many cases these fabric covers are fastened using press fasteners which comprise a female cap member attached to the fabric cover around a peripheral edge portion thereof together with a male stud member which has a peripheral rim extending into the cap member for readily releasable and reengageable snap fastening arrangements. A plurality of such fasteners are arranged at spaced positions around the periphery of the fabric cover. Such arrangements have been manufactured and widely sold for many years.

On prior art technique for attachment of the male stud member to a surface of the vehicle involves drilling a hole in the vehicle surface and using a self-tapping screw engaged through a central hole in the stud member to clamp the stud member to the vehicle surface. However this technique has a significant disadvantage that the vehicle owner in many cases does not want to perforate the vehicle surface in view of the difficulties which can be caused to the rust and corrosion prevention coatings of the surface. There is a reluctance therefore to purchase covers of this type which require the user to drill holes in the vehicle surface.

One solution which has been provided therefore in regard to the tonneau cover on the truck box is to manufacture a rail system which is initially attached to the vehicle using openings already available in the vehicle following which the tonneau cover is attached to the rails using the conventional press fastener systems. This system however of course requires significant extra parts to be manufactured, transported and assembled for the finished product. However the reluctance of users to perforate the vehicle surface has lead to such complex solutions to this long standing problem.

Applicant's U.S. Pat. No. 5,797,643, incorporated herein by reference, outlined a further solution in which a male stud portion having a rigid disc-shaped base and a cylinder projecting from one side of the disc to carry the peripheral engagement rim is adhesively secured to the vehicle surface, either by an adhesive layer fixed directly to the bottom surface of the disc or an adhesive layer fixed to a bottom surface of a flexible plastic sheet to which the male stud portion can be engaged by fitting a stud member on the flexible sheet through a hole in the disc of the male stud portion. The disc of the male stud portion can be mounted directly when the vehicle surface in question is flat, but the separate stud-equipped flexible sheet is needed to mounted the rigid male portion on an arcuate or curved surface.

The present invention improves on the prior art by providing a one-piece male stud portion that can be mounted to flat, curved or bent surfaces without requiring a separate piece for accomplishing the adhesive attachment to the vehicle surface.

SUMMARY OF THE INVENTION

According to a first aspect of the invention there is provided a vehicle comprising:
  a vehicle body having at least one opening therein to be covered;
  a plurality of vehicle surfaces arranged around said at least one opening;
  a fabric cover for engaging over the opening and having edge portions for engaging respective ones of the vehicle surfaces; and a plurality of fastening elements for fastening the edge portions to the respective vehicle surfaces;
    each fastening element comprising:
    a female cap member attached to a respective fabric edge portion;
    a unitary male stud member having a flexible base portion and a projecting portion integral therewith, a peripheral rim of the projecting portion standing upwardly from the base portion and being engageable into the cap member as a readily releasable and reengageable snap fastener and a bottom surface of the flexible base portion opposite the projecting portion following a curvature of the respective vehicle surface; and
    a layer of adhesive having one surface adhesively fastened to the bottom surface of the base portion and an opposed surface fastened to the respective vehicle surface;
  wherein at least one of the respective vehicle surfaces is non-planar and at least some of the bottom surface of the flexible base portion on said one of the respective vehicle surfaces is deformed to conform thereto.

According to a second aspect of the invention there is provided an apparatus comprising:
  a body having a portion thereon to be covered;
  a plurality of body surfaces arranged around said portion;
  a fabric cover for engaging over the portion and having edge portions for engaging respective ones of the body surfaces; and
  a plurality of fastening elements for fastening the edge portions to the respective body surfaces;
    each fastening element comprising:
    a female cap member attached to a respective fabric edge portion;
    a unitary male stud member having a flexible base portion and a projecting portion integral therewith, a peripheral rim of the projecting portion standing upwardly from the base portion and being engageable into the cap member as a readily releasable and reengageable snap fastener and a bottom surface of the flexible base portion opposite the projecting portion following a curvature of the respective body surface; and
    a layer of adhesive having one surface adhesively fastened to the flexible attachment member and an opposed surface fastened to the respective body surface;
  wherein at least one of the respective body surfaces is non-planar and at least some of the bottom surface of the flexible base portion on said one of the respective body surfaces is deformed to conform thereto.

According to a third aspect of the invention there is provided a kit of parts for attachment of a cover to a vehicle comprising:

a fabric cover for engaging over a portion of the vehicle and having edge portions for engaging respective vehicle surfaces;

a plurality of fastening elements for fastening the edge portions to the respective vehicle surfaces;

each fastening element comprising:

a female cap member attached to a respective fabric edge portion;

a plurality of male fastening elements, each comprising a unitary male stud member having a flexible base portion and a projecting portion integral therewith, a peripheral rim of the projecting portion standing upwardly from the base portion and being engageable into the cap member as a readily releasable and reengageable snap fastener, a bottom surface of the flexible base opposite the projection portion being deformable relative to the projecting portion; and a layer of adhesive having one surface adhesively fastened to the flexible attachment member and an opposed surface and an opposed surface covered by a removable covering layer and exposable by removal of the covering later for fastening to the respective vehicle surface.

According to a fourth aspect of the invention there is provided a fastening element comprising:

a female cap member;

a unitary stud body defining a flexible base portion and a projecting portion integral therewith, a peripheral rim of the projecting portion standing upwardly from the base portion and being engageable into the female cap member as a readily releasable and reengageable snap fastener, a bottom surface of the flexible base opposite the projection portion being deformable relative to the projecting portion; and a layer of adhesive having one surface adhesively fastened to the bottom surface of the flexible base portion and an opposed surface covered by a removable covering layer and exposable by removal of the covering later for fastening to a surface of a body on which the snap fastener is to be used.

Preferably the flexible base portion has a plurality grooves formed therein and each extending fully across the base portion.

Preferably the grooves are formed in a top surface of the base portion opposite the bottom surface thereof.

Preferably the grooves are formed on opposite sides of the projecting portion.

Preferably the grooves are parallel with one another.

In use of the fastening element, said one of the respective vehicle surfaces may feature a bend from which portions of said one of the respective surfaces diverge, one of the grooves in the flexible base portion on said one of the respective vehicle surfaces extending along said bend with the flexible base portion bending across the groove.

Preferably the projecting portion of each fastening element has a first outer diameter from which the peripheral rim projects outwardly and has a second outer diameter smaller than the first outer diameter where the flexible base connects to the projecting portion integral therewith.

Preferably the projecting portion of each fastening element is hollow and a hollow interior of the projecting portion is open at a top end thereof opposite the base and closed at a bottom end thereof by the base.

BRIEF DESCRIPTION OF THE DRAWINGS

In the accompanying drawings, which illustrate an exemplary embodiment of the present invention:

FIG. 4 shows a kit of parts which can be purchased by a user for attachment to a vehicle of the type shown in FIG. 1.

DETAILED DESCRIPTION

Figure 1:
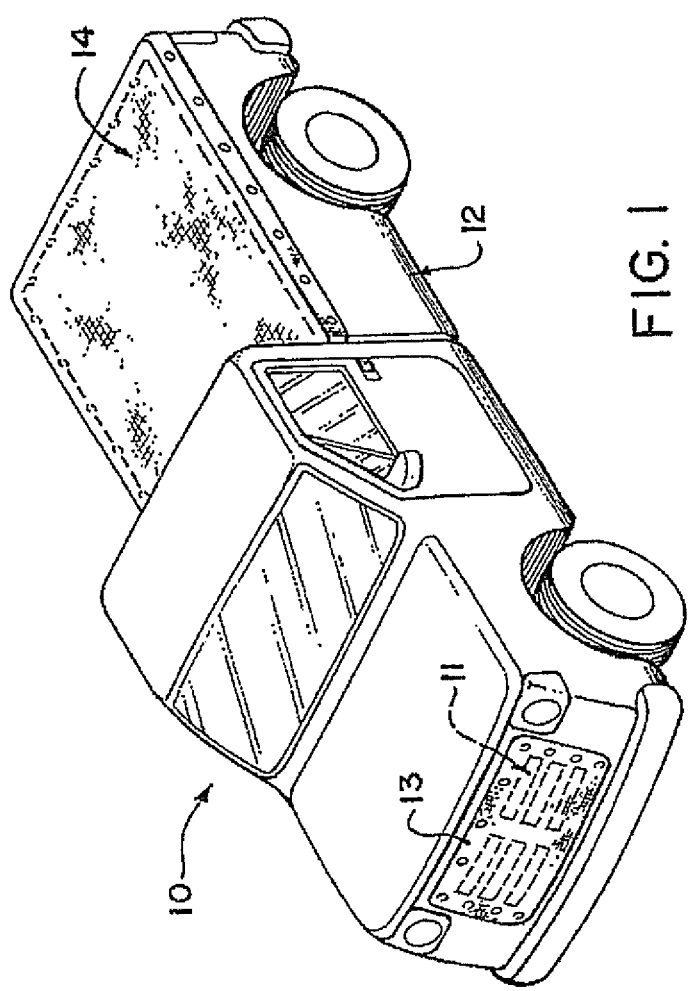
FIG. 1 is an isometric view showing simply a vehicle of the type having a vertical front grill and an open rear box with the front grill covered by a fabric cover and the box cover covered by a tonneau cover.

In FIG. 1 shows a vehicle which is generally indicated at 10 and is of the pick-up truck type including a nearly vertical upright front grill 11 and a rear box 12. The front grill 11 is covered by a fabric panel 13 and the box is covered by a tonneau cover 14. The vehicle is of conventional construction and shown only schematically. The covers 13 and 14 are also shown only schematically as these are well known to one skilled in the art and can vary in accordance with the requirements.

Figure 2:
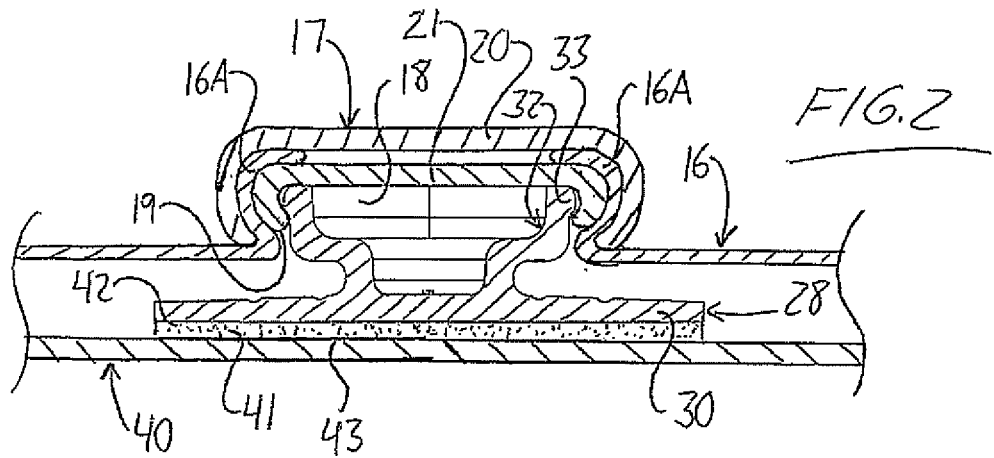
FIG. 2 is a cross sectional view showing one of the fastening elements by which the covers are fastened to the vehicle surfaces installed on a flat one of those surfaces.

The present invention is concerned with the technique for fastening the covers 13 and 14 to the vehicle, and the elements for forming this fastening technique are shown in FIGS. 2, 3 and 4. Thus in FIG. 4 is shown one of the covers which is generally indicated at 15 comprising a fabric sheet 16 and a plurality of female cap-type fasteners 17. Also in FIG. 4 is shown a male fastener generally indicated at 28. Further details of the male fastener 28 are shown in FIGS. 2 and 3.

In general each of the fasteners is of a type best shown in FIG. 2. In this type of fastening arrangement, there is provided a female cap portion 17 which defines a relatively shallow cap having a female recess 18 and a peripheral engagement rim 19 surrounding the recess 18. The fabric 16 has portions 16A clamped to the cap 17, and in the arrangement shown this is effected by an outer cap section 20 which pinches the portion 16A between the outer cap section 20 and an inner cap section 21 defining the recess 18. The female cap 17 cooperates with the male portion 28 in a snap fastening arrangement.

The male portion 28 is a single, unitary, integral piece made of a single material that defines a flexible disc 30, which has a bottom circular surface 31, and an upstanding fastening portion 32 with an engagement rim 33. The rim 19 of the cap 17 is thus arranged as a snap-fit over the rim 33 of the upstanding projecting portion 32. The flexible circular disc 30 underlies and surrounds the cylindrical portion and projects outwardly therefrom. The flexible disc and upstanding fastening portion 32 are seamlessly integral with one another as a result of the one-piece construction of the male portion 28, as opposed to the seam that would result from instead trying to produce a similar structure by fastening two originally-separate pieces together to form a flexible base on a significantly more rigid piece carrying the fastening portion.

In the installed arrangement shown in FIG. 2, the disc is bonded to a planar vehicle panel surface 40 of the vehicle by a layer 41 of an adhesive material. The layer 41 has an upper surface 42 adhesively bonded to the bottom surface 31 of the disc. The layer 41 has a bottom surface 43 adhesively bonded to an upper surface of the vehicle panel 40.

In the kit of parts shown in FIG. 4, the layer 41 is supplied in a condition in which it is covered by a sheet 44 of a non-adhesive plastics material which covers the adhesive surface 43 of the layer 41 and thus prevents inadvertent adhesion to surrounding elements. In operation, the layer 44 is removed and the adhesive layer 41 applied to the vehicle surface to provide an adhesive bonding effect of the male portion 28 to the vehicle surface.

With the male portion so bonded in place, the fabric cover can be snap-fastened into place simply by pressing the female caps over the respective male portions in their bonded positions, which are arranged in an array matching the array of female caps 17 on the fabric cover 16.

In a situation where the vehicle surface at the position where the snap fastener is to be located is entirely flat over the area at which it desirable to secure the stud, the male fastening portion 28 functions in the same manner as the rigid-base stud disclosed in Applicant's aforementioned prior art patent by being directly fastened atop the planar vehicle surface. However, while the prior art male portion 28 required a separate flexible piece in order to allow the male portion to be adhesively secured to a non-planar surface that is curved or features multiple planar sections interconnecting at and diverging away from bends or corners in the surface, the flexible disc-shaped base 30 of male fastening portion 28 of the present invention allows direct adhesion to such non-planar surfaces without requiring an additional piece.

FIG. 3 illustrates this added functionality.

Figure 3A:
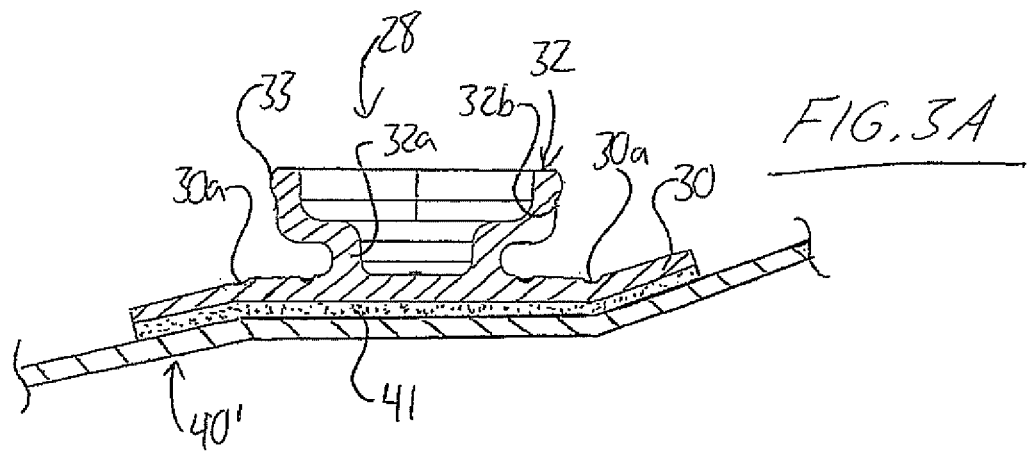
FIG. 3A is a vertical cross sectional view through the male stud of a second fastening element installed on a bent vehicle surface.

FIG. 3A shows the male portion 28 adhered to a three section surface 40' in which three flat, but not coplanar, sections collectively make up the area at which it is desirable to secure a male fastening portion 28. With reference to FIG. 4, a top surface of the flexible disc-shaped base 30 of the male fastener portion 28 features a plurality of parallel grooves 30a recessed therein. The illustrated embodiment features four such parallel grooves, two on each side of the projecting portion 32 projecting upward from this top surface of the disc 30. Each linearly extending groove travels fully across the disc along a respective chord of the disc's circular shape, therefore extending fully to the perimeter of the disc at each end of the groove to open to the disc's outer periphery. As best seen in FIGS. 2 and 3, the top surface of the illustrated disc 30 has a slight linear slope toward the bottom surface of the disc in each radial direction extending outward from the disc's center positioned coaxially beneath the projecting portion 32. With the bottom surface of the disc 30 being planar when the disc is seated flat on a horizontal surface, the slight slope of the top surface of the disc means that the thickness of the disc 30 tapers slightly moving radially outward toward its peripheral edge. The thinner nature of the disc 30 closer to its outer edge means that the disc is more flexible further away from the projecting portion 32.

FIG. 3A demonstrates that in order for the flexible disc 30 to best conform to a bent vehicle surface to which it is adhesively secured, one of the grooves 30a in the disc 30 can be placed to overlie a linear bend line in the surface 40' so that the disc 30 bends along that groove 30a in order to change direction at the same angle as the bend in the surface 40', thereby providing the best possible conformance between the adhesive-carrying bottom surface of the disc 30 and the relatively sloped sections of the surface. The particular configuration of the surface to which the male piece 28 of the fastener is secured in FIG. 3A, with a central horizontal section and two obliquely inclined sections sloping respectively upward and downward from the central section on opposite sides thereof, is illustrated not to represent a particular vehicle surface for which the fastener is intended for use, but rather to illustrate that the outer portions of the disc defining the peripheral edge thereof can be bent upward or downward relative to the central portion of the disc disposed to the inside of the grooves. Accordingly, the bend lines provided in the disc 30 by the grooves 30a give the male piece 28 the flexibility to adapt to a number of different possible surface configurations in which it may be desirable to use a fastener of the present invention. Providing more than one groove 30a on each side of the projecting portion 32 also helps by providing multiple fold or bend axes on each side whereby placement of a different groove 30a over a particular surface bend allows control over how much of the disc 30 rests on each of the two surface sections joining at that bend to allow the user to select a best one of the possible positions for the application. While the disc 30 of FIG. 3A is positioned on surface sections with rather minor relative slopes between them, it may be able to bend through ninety degrees, for example allowing the piece to be installed in a recessed cavity or elevated position while still using the full bonding surface area provided by the disc by folding upward or downward at the outer grooves to position opposing outer regions of the disc along side walls of the recess or wall profile.

Figure 3B:
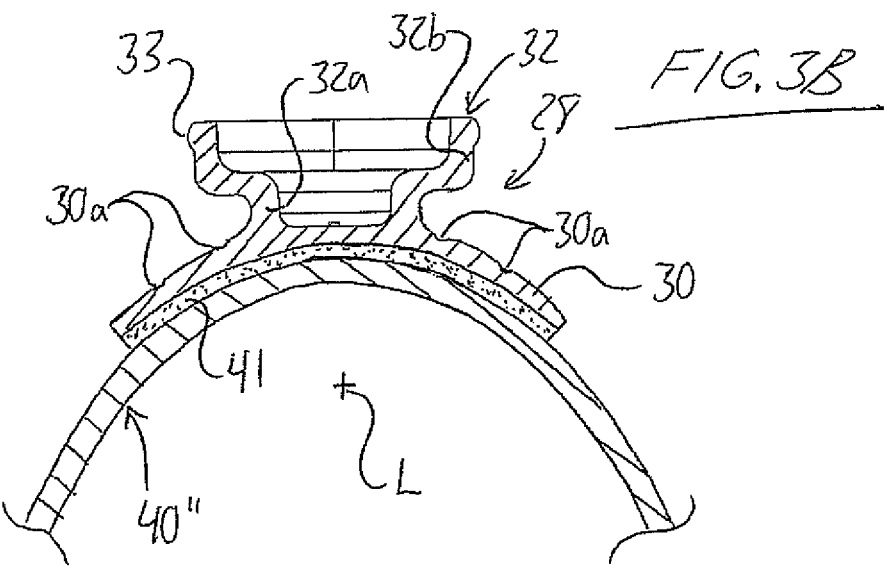
FIG. 3B is a vertical cross sectional view through the male stud of a third fastening element installed on a curved vehicle surface.

FIG. 3B shows the male piece 28 adhered to a curved surface 40", illustrating that it is not limited to use on an entirely planar surface area (FIG. 2) or adjacently connected but non-parallel surface areas (FIG. 3A). With the male fastener piece 28 oriented to lay the grooves 30a in the disc 30 parallel to a linear axis L about which the surface 40" curves, the bend lines provided by the reduced-thickness grooved portions of the disc 30 aid in the curved bending of the disc 30 abut the axis to better conform to the surface curvature.

The flexibility of the disc 32 for deforming the bottom surface thereof to conform to the recipient surface to which it is adhesively secured is further enhanced by the illustrated configuration of the projecting portion 32 as a hollow structure with cylindrical wall sections of varying diameter that increases moving away from the disc 30. The projecting portion has a lower cylindrical section 32a at which the integral connection to the disc 30 is formed, and an upper cylindrical section 32b disposed atop the lower section with a larger outer diameter than the lower section and larger inner diameter of the lower section. The change in diameter moving along the projection portion 32 is stepwise in nature, with the projection portion extending outward in a radial plane normal to its longitudinal axis at the integral joining of the two sections. The wall thickness over the full height of the projecting portion is substantially uniform, and so the increase in diameter not only applies to the outer diameters moving from the lower section to the upper section, but also to the inner diameters. The hollow interior of the stud defined by the projecting portion 32 may thus be considered as a larger diameter upper chamber, and a smaller diameter lower chamber open thereto immediately therebeneath. The engagement rim 33 of the stud is integrally defined with the periphery of the larger diameter upper section 32b at the upper extent thereof. Accordingly, moving downward from the distal end of the projecting portion 32 opposite the disc 30, the projecting portion decreases twice in outer diameter: once from the rim 33 to the outer peripheral surface of the remainder of the upper section 32b, and again from the upper section 32b to the lower section 32a therebeneath.

The hollow structure of the stud provides an interior space capable of accommodating any feature that may be disposed in or project from the female recess 18 of a female cap member 17 to be engaged on the stud. For example, with reference to FIG. 2, if the cap member 17 was instead riveted to the flexible cover sheet 16, a portion of the completed rivet would depend into the female recess 18, and thus require a hollow space in the stud to accommodate it. The hollow stud structure thus allows it to be used with different types of female snap elements. Having the stud hollow over most of its height, but yet closed at the bottom by a circular central portion of the disc 30 disposed beneath the stud's hollow interior balances the maximization of the hollow interior depth to accommodate projecting features of female cap members with maximization of the available bottom surface area of the disc 30 for adhesion to the vehicle surface to increase the bond strength of the male piece 28 to the vehicle. Positioning of the grooves 30a in the top of the disc also contributes to the use of the entire bottom surface of the disc for adhesion purposes to maximize the overall adhesive bonding strength.

The slight increase in disc thickness from the outer edges of the disc 30 to the central portion thereof helps increase the rigidity with which the integral engagement rim 32 on the projecting portion is carried on the central portion on the disc 30 to help substantially retain the shape and position of the rim 33 during pushing of a female cap onto the stud to effect the snap fit, while the full-depth hollow interior of the stud reaching fully down to where the disc joins the lower cylindrical section balances with this so as to retain some flexibility in the central portion of the disc 30 disposed directly beneath the stud. While some or all of the stud interior could instead be filled with material, this would not only be detrimental the suitability of the male piece 28 as a universal snap fastener stud cooperable with female cap types with or without projecting features, but also may result in a reduction of the deformability of the bottom surface of the disc 30 directly beneath the projecting portion 32, thereby reducing the overall effective flexibility of the disc and its degree of shape conforming capability. The illustrated positioning of an inner one of the grooves 30a on each side of the projecting portion at a position directly beneath the larger diameter upper section thereof, nearly immediately adjacent the integral joining of the disc and projecting portion, increases the flexibility of the disc 30 near the projecting portion across the bend line or axis defined by this linear groove.

The multi-step reduction of the projecting portion 32 moving therealong toward the disc 30 also helps maximize the flexibility of the disc 30 to better ensure compliance to the shape of an intended recipient surface of a vehicle. If the larger diameter of the illustrated upper section 32b was alternatively applied fully from the engagement rim 33 to the base disc 30, the annular outer portion of the disc 30 left outward from the integral connection to the projecting portion 32 would be smaller. As the flexibility of the disc 30 increases moving away from the central projecting portion 32, the amount by which the outer periphery of the disc can flex upward and downward would accordingly be reduced, again reducing the conforming abilities of the disc 30 and thus reducing the number of differently shaped vehicle surfaces the male piece 28 could be secured to with maximum adhesion surface area between the disc and vehicle surface.

The use of the illustrated circular disc shape of the flexible base 30, or an oval-shaped disc, lacks corners so as to avoid the presence of points or sharp corners which, when the base is attached to the vehicle, can be picked or abraded and thus increase the possibility of the sheet being removed from its adhesive position on the vehicle surface. The adhesive layer, as may be provided by double sided tape applied to the male part, is coextensive with the undersurface of the flexible disc itself.

The fasteners described above are not limited to the illustrate use for a tonneau cover, and for example may be used to mount a grill cover in the position described in Applicant's aforementioned prior patent or for other vehicular or non-vehicular applications. The one-piece male or stud element described herein can be molded from Lexan™ polycarbonate material, but it may be possible to use other suitable materials to produce the described the one-piece configuration with a flexible base and relatively more rigid stud projection carried thereon. An additional drawing sheet is enclosed herewith as an appendix, and presents exemplary dimensions of a particular embodiment, which are not intended as limiting to the scope of the present invention.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A vehicle comprising:
   a vehicle body having at least one opening therein to be covered;
   a plurality of vehicle surfaces arranged around said at least one opening;
   a fabric cover for engaging over the opening and having edge portions for engaging respective ones of the vehicle surfaces; and a plurality of fastening elements for fastening the edge portions to the respective vehicle surfaces;
   each fastening element comprising:
      a female cap member attached to a respective fabric edge portion;
      a unitary male stud member formed solely of a single material and comprising a flexible base portion, a projecting portion that is seamlessly integral with said flexible base portion and defines a stud of greater rigidity than said flexible base portion, a peripheral rim of the projecting portion that stands upwardly from the base portion and is engageable into the cap member as a readily releasable and reengageable snap fastener, and a bottom surface of the flexible base portion that is situated opposite the projecting portion and follows a curvature of the respective vehicle surface; and
      a layer of adhesive having one surface adhesively fastened to the bottom surface of the base portion and an opposed surface fastened to the respective vehicle surface;
   wherein at least one of the respective vehicle surfaces is non-planar and at least some of the bottom surface of the flexible base portion on said one of the respective vehicle surfaces is deformed to conform thereto.

2. The vehicle according to claim 1 wherein the flexible base portion has a plurality grooves formed therein and each extending fully across the base portion.

3. The vehicle according to claim 2 wherein the grooves comprise parallel grooves formed in a top surface of the base portion opposite the bottom surface thereof on opposite sides of the projection portion.

4. The vehicle according to claim 1 wherein the projecting portion of each fastening element has a first outer diameter from which the peripheral rim projects outwardly and has a second outer diameter smaller than the first outer diameter where the flexible base connects to the projecting portion integral therewith.

5. The vehicle according to claim 1 wherein the flexible base is tapered to narrow in thickness moving toward an outer peripheral edge thereof.

6. The vehicle according to claim 1 wherein the single material of the unitary male stud member is a polycarbonate material.

7. An apparatus comprising:
a fabric cover for engaging over an area and having edge portions for engaging respective surfaces arranged around said area; and
a plurality of fastening elements for fastening the edge portions of the fabric cover to the respective surfaces;
each fastening element comprising:
a female cap member attached to a respective fabric edge portion;
a unitary male stud member formed solely of a single material and comprising a flexible base portion, a projecting portion that is seamlessly integral with said flexible base portion and defines a stud of greater rigidity than said flexible base portion, a peripheral rim of the projecting portion that stands upwardly from the base portion and is engageable into the cap member as a readily releasable and reengageable snap fastener, and a bottom surface of the flexible base portion that is situated opposite the projecting portion and is deformable relative to the projecting portion; and
a layer of adhesive having one surface adhesively fastened to the flexible attachment member and an opposed surface arranged for fastening to the respective surface;
wherein flexibility of the base portions of the unitary male stud members of the fastening element enables the bottom surfaces of said base portions to conform to a non-planar one or more of said respective surfaces through deformation of said bottom surfaces of the base portions.

8. The apparatus according to claim 7 wherein the flexible base is tapered to narrow in thickness moving toward an outer peripheral edge thereof.

9. The apparatus according to claim 7 wherein the flexible base portion has a plurality grooves formed therein and each extending fully across the base portion.

10. The apparatus according to claim 7 the flexible base portion has a plurality of parallel grooves formed in a top surface of the base portion opposite the bottom surface thereof, the grooves extending fully across the base portion on opposite sides of the projecting portion.

11. The apparatus according to claim 7 wherein the projecting portion of each fastening element has a first outer diameter from which the peripheral rim projects outwardly and has a second outer diameter smaller than the first outer diameter where the flexible base connects to the projecting portion integral therewith.

12. The apparatus according to claim 7 wherein the single material of the unitary male stud member is a polycarbonate material.

13. A kit of parts for attachment of a cover to a vehicle comprising:
a fabric cover for engaging over a portion of the vehicle and having edge portions for engaging respective vehicle surfaces;
a plurality of fastening elements for fastening the edge portions to the respective vehicle surfaces;
each fastening element comprising:
a female cap member attached to a respective fabric edge portion;
a plurality of male fastening elements, each comprising a unitary male stud member formed solely of a single material, the unitary male stud member comprising a flexible base portion, a projecting portion that is seamlessly integral with said flexible base portion and defines a stud of greater rigidity than said flexible base portion, a peripheral rim of the projecting portion that stands upwardly from the base portion and is engageable into the cap member as a readily releasable and reengageable snap fastener, and a bottom surface of the flexible base that is situated opposite the projection portion and is deformable relative to the projecting portion; and
a layer of adhesive having one surface adhesively fastened to the flexible attachment member and an opposed surface and an opposed surface covered by a removable covering layer and exposable by removal of the covering later for fastening to the respective vehicle surface.

14. The kit of parts according to claim 13 wherein the flexible base is tapered to narrow in thickness moving toward an outer peripheral edge thereof.

15. The kit of parts according to claim 13 wherein the flexible base portion has a plurality grooves formed therein and each extending fully across the base portion.

16. The kit of parts according to claim 13 the flexible base portion has a plurality of parallel grooves formed in a top surface of the base portion opposite the bottom surface thereof, the grooves extending fully across the base portion on opposite sides of the projecting portion.

17. The kit of parts according to claim 13 wherein the projecting portion of each fastening element has a first outer diameter from which the peripheral rim projects outwardly and has a second outer diameter smaller than the first outer diameter where the flexible base connects to the projecting portion integral therewith.

18. The kit of parts according to claim 13 wherein the single material of the unitary male stud member is a polycarbonate material.

* * * * *